(12) United States Patent
Kanerva et al.

(10) Patent No.: US 7,713,014 B2
(45) Date of Patent: May 11, 2010

(54) EXPLOSIVE BOLT

(76) Inventors: Pentti Kanerva, Sandeslattskroken 2, S-424 36 Angered (SE); Jouko Laitinen, Manuntic 21 A3, FIN-35600 Halli (FI); Keijo Ketonen, Rantatie 9, FIN-35600 Halli (FI)

( * ) Notice: Subject to any disclaimer, the term of this patent is extended or adjusted under 35 U.S.C. 154(b) by 680 days.

(21) Appl. No.: 10/573,437

(22) PCT Filed: Sep. 16, 2004

(86) PCT No.: PCT/SE2004/001338

§ 371 (c)(1),
(2), (4) Date: Apr. 30, 2007

(87) PCT Pub. No.: WO2005/031247

PCT Pub. Date: Apr. 7, 2005

(65) Prior Publication Data

US 2007/0274806 A1 Nov. 29, 2007

(30) Foreign Application Priority Data

Sep. 26, 2003 (SE) .................................. 03025556

(51) Int. Cl.
*F16B 37/08* (2006.01)
(52) U.S. Cl. ........................ 411/434; 411/391
(58) Field of Classification Search ................ 411/390, 411/391, 19, 20, 434
See application file for complete search history.

(56) References Cited

U.S. PATENT DOCUMENTS

| | | | |
|---|---|---|---|
| 2,556,672 A * | 6/1951 | Bergh et al. ................... | 89/1.57 |
| 2,912,901 A | 11/1959 | Kroeger et al. | |
| 3,053,131 A * | 9/1962 | Stott ........................... | 411/391 |
| 3,204,515 A * | 9/1965 | Dickie et al. ................. | 411/434 |
| 3,408,890 A * | 11/1968 | Bochman, Jr. .............. | 411/391 |
| 4,671,715 A * | 6/1987 | Berg .............................. | 411/8 |
| 4,725,176 A * | 2/1988 | Connolly et al. ............ | 411/427 |
| 5,119,555 A * | 6/1992 | Johnson ....................... | 29/254 |
| 5,727,288 A | 3/1998 | Byon | |
| 6,412,584 B1 * | 7/2002 | Faigle et al. ................. | 180/282 |
| 7,461,859 B2 * | 12/2008 | Fogle et al. ................. | 280/739 |

OTHER PUBLICATIONS

International Preliminary Report on Patentability dated May 11, 2006.

* cited by examiner

*Primary Examiner*—Flemming Saether
(74) *Attorney, Agent, or Firm*—Knobbe Martens Olson & Bear LLP

(57) ABSTRACT

An explosive attachment device for mechanical connection of components, internally provided with an explosive charge, the detonation shock effect of which is strong enough for rupturing a connection forming part of the attachment device for a rapid disconnection, whereby the attachment device incorporates an attachment screw (2) and an explosive attachment element (4-14) which comprises a cylinder (4), a cover (5), and a piston (6) mounted in the cylinder (4), a space between the piston (6) and the bottom of the cylinder (4) is provided with a circular row of small holes (14), the piston (6) is provided with a rod (7) that the attachment screw (2) is mounted to, in the space between the piston and the cover (5) is arranged the explosive charge (9) with a firing device (10, 11,12,13) having a delay mechanism, whereby the blasting pressure is converted to a pulling stress, which acts upon the attachment screw (2) to be pulled off without the other parts splintering.

7 Claims, 2 Drawing Sheets

EXPLOSIVE BOLT

BACKGROUND OF THE INVENTION

The present invention refers to a new type of explosive attachment device, which is suitable for being used for mounting of different mechanical components, thus that the joint if needed can be severed immediately by means of detonation In such a manner that the very detonation will not be a risk of accidents for human beings or animals.

The explosive bolt described above is appropriate for being used for such connections, which have to be openable rapidly due to an emergency situation. A large field of such use is for Instance for mounting of vehicle doors and the new device is particularly useful for this purpose. Nowadays door hinge systems both for passenger cars and for lorries are constructed so, without exception, that it at a somewhat more violent collision is an evident risk, that vehicle doors get stuck, as a heavy demolition of the car body will compress doors as well as door openings. The axes of the hinges might also loose their parallelism and door locks can be damaged, and all this taken together can make opening of the car doors more difficult or even impossible after a violent collision, which in turn can cause dangerous situations of different degrees for passengers. Outer circumstances can also worsen accidental situations. Such an example is when a car turns over and possible obstacles at the ground such as rocks, ditches, different types of large objects, etcetera, can prevent the car doors from being opened. Furthermore it is also usual that passengers loose consciousness and it is then even more difficult for the rescue team to help them to come out of the vehicle.

The explosive charge In an explosive attachment device must be strong enough for causing the desired effect to separate the connected components, but this also leads to undesired side effects. If the device is constructed so, that it will be blasted completely to pieces, it is easy that there as a result is dangerous metal splinters, and also small volumes of appropriate explosive, which is commonly used in such circumstances, cause considerable force at the detonation, which can result in that the metal splinters will have a high velocity, which therefore have a large possibility of penetrating through the typical thin sheet metal structures, which are common in car bodies and therefore the passengers are subjected to danger. The chock effect of the detonation is also undesired and means a risk e.g. for impaired hearing to the passengers. Furthermore the handling of the explosive components must be considered In connection to storing and transport and also at the time of production of the cars, and in case of a possible unintended detonation, the risk for personal injuries must be minimized.

There are a number of known proposals for explosive attachment devices In form of different versions of explosive bolts, which principally could be used for assembly of car door hinges in order to reduce the problems described above In connection to accidents. Such proposals are disclosed for Instance In: U.S. Pat. No. 5,997,230, U.S. Pat. No. 3,754,496, U.S. Pat. No. 2,653,504, U.S. Pat. No. 3,582,017, U.S. Pat. No. 1,400,401 and DE 2203470. These proposals are anyhow intended to be used primarily within space travel technology and for military use and for both these fields of use there are basically other conditions than for cars and for that reason the known solutions are not suited for mounting of car doors. In space travel persons are not directly subjected to detonations of explosive bolts with metal splinters, which is the case in cars. Within the military field, explosive bolts are e.g. used in mines and missiles and the like and the situation is quite the opposite, as any splinter may even be desirable.

It can furthermore be established that in the proposals mentioned above, the detonation takes place substantially immediately after Initiation, without any time delay at all, and this is an impossible situation in respect of mounting of car doors with aid of explosive bolts. At a violent collision the cars are often making a passage through the air with tumbling motion and it Is evident, that a loosening of the doors at a too early stage, could be nearly a catastrophe. The car must come to a stop and its position must be stabilized before it Is time for the doors to be separated by detonation of any type of door hinge attachment.

BRIEF SUMMARY OF THE INVENTION

The purpose of the invention is to eliminate the shortages described above by providing a new type of explosive attachment device to be used for mounting of different mechanical components, e. g. vehicle doors, thus that the component when needed can be separated by means of a detonation without causing the passengers any risk, and of the type which is built in such a manner, that an explosive attachment element pulls apart an attachment screw mounted therein by means of detonation without causing metal splinters or a violent shock effect and which attachment element is provided with a built in delayed-action firing device, which is therefore protected and. in working order independent of external conditions. In one embodiment, the invention comprises an explosive attachment device for mechanical connections of components, internally equipped with an explosive charge, the detonation shock effect of which is strong enough for rupturing a connection forming part of the attachment device, for a rapid disconnection, characterized therein, that the attachment device incorporates an attachment screw (2), which extends through the interconnected components (1) and an explosive attachment element (4-14) in which the attachment screw (2) is fixedly mounted, thus that the interconnected components (1) are clamped between the head of the said attachment screw (2) and the explosive attachment element (4-14), which explosive element (4-14) comprises a cylinder (4), which is closed by means of a cover (5), which engages against one of the interconnected components (1) and a piston (6) mounted in the cylinder (4), which has substantially the same outer diameter as the inner diameter of the cylinder (4), and which piston (6) is arranged inside the cylinder (4) thus that there is a substantial space at both sides of the piston (6), whereby in the space between the piston (6) and the bottom of the cylinder (4) is provided a circular row of small holes (14) in the wall of the cylinder (4) at a distance from the bottom of the cylinder (4), which is at least equal to the height of the piston (6) at its biggest diameter and which piston (6) is provided with a rod (7) with a substantially smaller diameter than the inner diameter of the cylinder (4) and which rod (7) extends in parallel to the longitudinal mean axis of the cylinder (4) through the cover (5), but not outside this, thus that the attachment screw (2) can be fixedly mounted in the rod (7) and in which cylinder (4) in the space between the piston and the cover (5) is arranged the explosive charge (9), which is provided with a firing device (10, 11, 12,13), which is equipped with a delay mechanism, whereby the attachment device after a time delay is arranged to be blasted in such a manner, that the blasting pressure is converted to a pulling stress, which acts upon the attachment screw (2) to be pulled off without the other part of the device being splintered.

BRIEF DESCRIPTION OF THE SEVERAL VIEWS OF THE DRAWING

Hereinafter the invention will be further described with reference to an embodiment Illustrated in the accompanying drawings.

DESCRIPTION OF PREFERRED EMBODIMENTS

Figure 1:
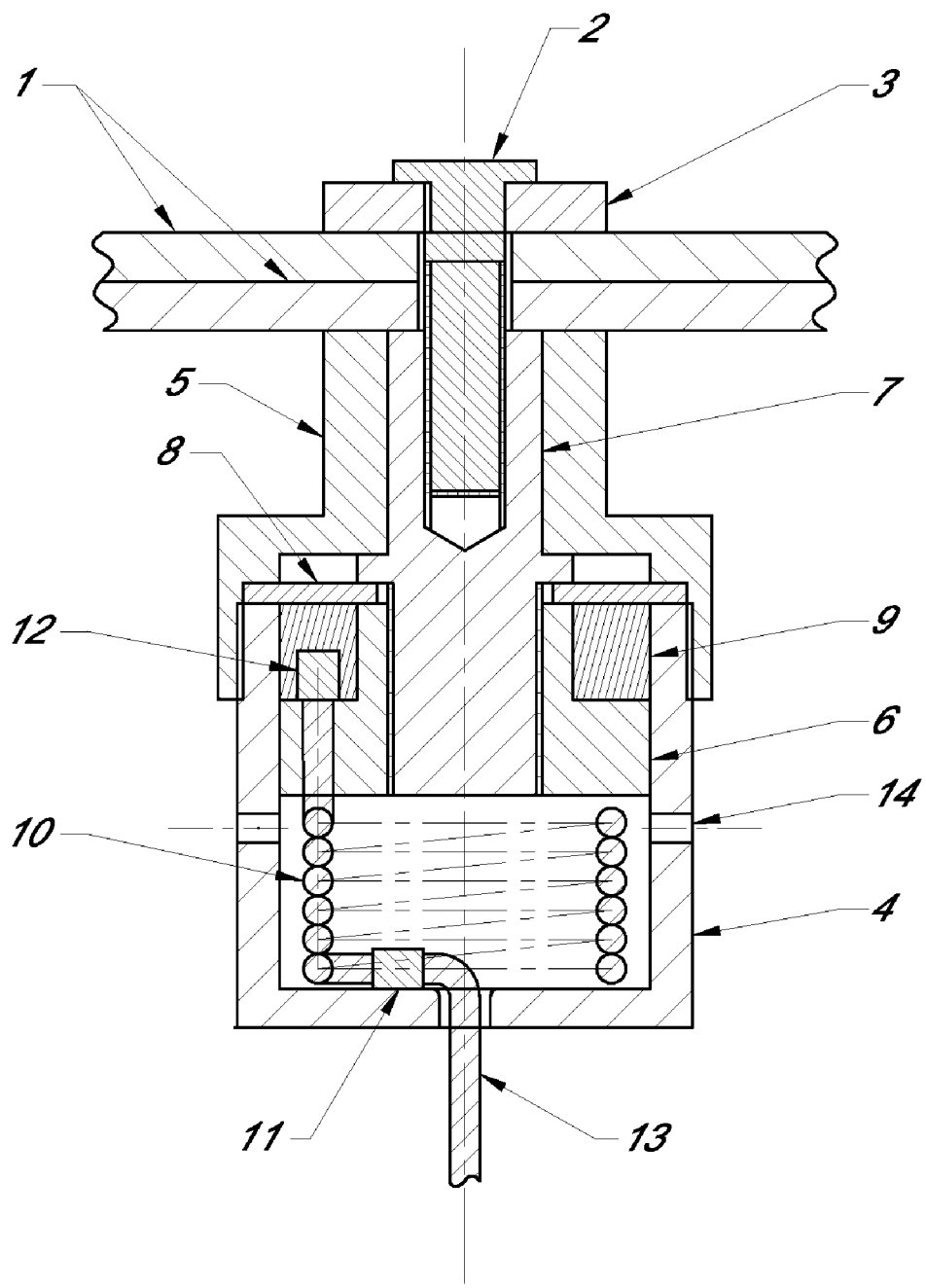
In FIG. 1 Is shown a cross-section of the proposed explosive attachment device.

In FIG. 1 is shown a cross section of an attachment device for interconnecting separate mechanical components (1), and which device incorporates an attachment screw (2) equipped with a washer (3) and an explosive attachment element (4-14). The screw (2) extends through the bores in the interconnected components (1) and is screwed into the attachment element (1-14) and therefore the components (1) are clamped together in usual manner between the attachment element (1-14) on one side and the washer (3), which is positioned under the head of the screw (2) on the other side.

The attachment screw (2) forming part of the device is provided with a head, the height of which along the circumference of the screw is dimensioned in such a manner, that an Imagined cylindrical, vertical surface, which is an imagined extension of the envelope surface of the screw (2) inside the head of the screw (2) is substantially as big as the smallest transversal surface of the screw (2) and therefore this imagined surface forms the most weak section in the screw (2). The washer (3) in this connection has a particular task beside the ordinary of preventing the screw (2) from passing through the bores, i.e. to act as a shearing tool and for that reason it is necessary that the washer (3) is manufactured from a harder material than the screw (2) and also that it is shaped in an appropriate manner, thus that the bore of the washer (3) is sufficiently much bigger than the diameter of the screw (2) with an appropriate tolerance, and furthermore that the edge of the hole is sharp.

The explosive attachment element (1-14) consists of a cylinder (4), which Is equipped with a cover (5), which engages one of the interconnected components (1) adjacent the attachment bore, a piston (6) mounted inside the cylinder (4) and provided with a rod (7) extending in parallel to the longitudinal mean axis of the cylinder (4) and In which rod (7) In the longitudinal direction of the cylinder (4) there is provided a threaded hole for the attachment screw (2), a locking washer (8) and an explosive charge (9) mounted in the cylinder (4) and having a firing device (10,11,12,13).

In the center of the cover (5) is provided a hole parallel with the longitudinal mean axis of the cylinder (4) and Intended for the rod (7), which extends closely through the hole, but anyhow so, that the rod (7) does not project outside the cover (5). In the edge in the side facing the cylinder (4) the cover (5) is provided with a collar, which for mounting of the cylinder (4) is equipped with an internal thread but not the entire way, but thus that there is a substantial distance between the thread and the bottom of the cover (5). The cylinder (4) is open in the end facing the cover (5) and it is closed at the opposite end and externally at the mouth there is a thread matching the thread at the inner side of the collar of the cover (5). The inner diameter of the cylinder (4) is substantially smaller than the inner diameter in the collar of the cover (5) and when the cover is mounted on the cylinder (4), the cylinder edge therefore will form a threshold in the inner wall of the closed space. The rod (7) is provided with a collar, the diameter of which is substantially larger than the diameter of the hole in the cover (5) in order to prevent the rod (7) from passing through the cover (5) and for transferring the mounting force via the cover (5) to the interconnected components (1). The piston (6) is mounted on the rod (7) by means of a threaded hole in the piston (6) and a corresponding thread on the rod (7). The piston (6) is provided with a shoulder thus that the outer diameter of the piston (6) at the side facing the cover is substantially smaller than the inner diameter of the cylinder (4), thus that the space between the cover (5) and the piston (6) increases. There is a thin and strong locking washer (8) with a central hole clamped between the piston (6) and the collar of the rod (7) In mounted position and which locking washer (8) has an external diameter, substantially as big as the inner diameter in the non-threaded part of the collar of the cover (5), but substantially smaller than the inner diameter of the cylinder (4). When the cover (5) is mounted on the cylinder, the locking washer (8) enters into the cover (5) thus that there is formed a space between the washer (8) and the bottom of the cover (5), and the piston (6) enters Into the cylinder (4), thus that the edge of the cylinder (4) is pressed against the locking washer (8), which in turn acts upon the collar of the rod (7), thus that the rod (7) is held against the cover (5) and the position of the piston (6) is thereby locked inside the cylinder (4) when the cover (5) is mounted on the cylinder (4). Rotation at mounting of the attachment screw (2) can be prevented for instance by means of a stop screw, which is mounted through the wall of the cylinder (4), thus that it is pressed against the piston (6) and in which piston (6) there is a corresponding groove thus that the stop screw will not prevent the longitudinal mean motion of the piston.

The cylinder (4) is substantially longer than the piston (6), which is arranged inside the cylinder (4) and positioned thus, that there is formed two chambers at opposite sides of the piston (6). In one of the chambers, which is limited of the cylinder (4), the piston (6) and the locking washer (8) there is mounted a sufficiently powerful explosive charge (9) and in the other chamber, which is limited by the piston (6) and the cylinder (4), there is provided a firing device (10,11,12,13) for detonation of the explosive charge (9). The firing device (10,11,12,13) consists of a blasting fuse (10) packed in spiral form and which is provided with two igniting fuses (11,12), one fitted at each end and an electric cable which enters from outside via a hole in the bottom of the cylinder (4) and which cable (13) is connected to the adjacent igniting fuse (11). The end of the blasting fuse (10), which is not connected to the electric cable (13) extends through a small hole through the piston (6), thus that the other igniting fuse (12) will be in contact with the explosive charge (9) in the chamber at the opposite side of the piston (6). In the wall of the cylinder (4) between the piston (6) and the bottom of the cylinder, there is, at a distance from the bottom of the cylinder (4) at least as big as the smallest height of the piston (6), a number of holes (14) of appropriate size arranged in a circular row, and which holes (14) are intended for pressure relief after a detonation.

When an external signal system couples electric current to the electric cable (13), the blasting fuse (10) is fired by means of one of the initiating fuses (11), which is connected to the electric cable (13) and in order to provide a long enough time delay for the detonation, the blasting fuse (10) thereafter burns for a sufficiently long time before the fire reaches the other initiating fuse (12) at the opposite end of the blasting fuse (10) at the other side of the piston. When this happens the initiating fuse (12) thereby initiates the explosive charge (9). The pressure which is generated as a consequence of the detonation then gives rise to power effects, which acts upon the piston (6), the cylinder (4) and the locking washer (8). The wall of the cylinder (4) is dimensioned thus that it is strong enough not to burst immediately, whereas the fixedly mounted locking washer (8), which is much weaker than the cylinder (4) and the piston (6), is broken and the piston (6) is thereby unbolted, and can now move and therefore transfer the shock effect via the rod (7) to the attachment screw (2) and effect a pulling stress in the attachment screw (2) and further a shearing load on the head of the screw (2). As the interconnected components (1) are positioned between the washer (3) and the attachment element (1-14), the head of the screw (2) therefore is punched away by means of the washer (3). The pressure of the detonation urges the piston (6) to pull the rod (7) and the attachment screw (2) into the cylinder (4) and the mechanical coupling between the interconnected components (1) therefore is terminated. When the piston (6) passes the pressure relief holes (14) further away at the wall of the cylinder (4), the blasting gases are removed via the holes (14) and the pressure in the cylinder (4) is lowered without causing the device to burst apart. The dimensions of the cylinder (4), the rod (7) and the piston (6) are dimensioned thus that the rod (7) will stay Inside the hole in the cover (5) when the piston (6) is in the bottom position and thereby the rod (7) prevents the blasting gases from being removed via the large hole in the cover (5) and cause undesired shock effects for the environment.

Figure 2:
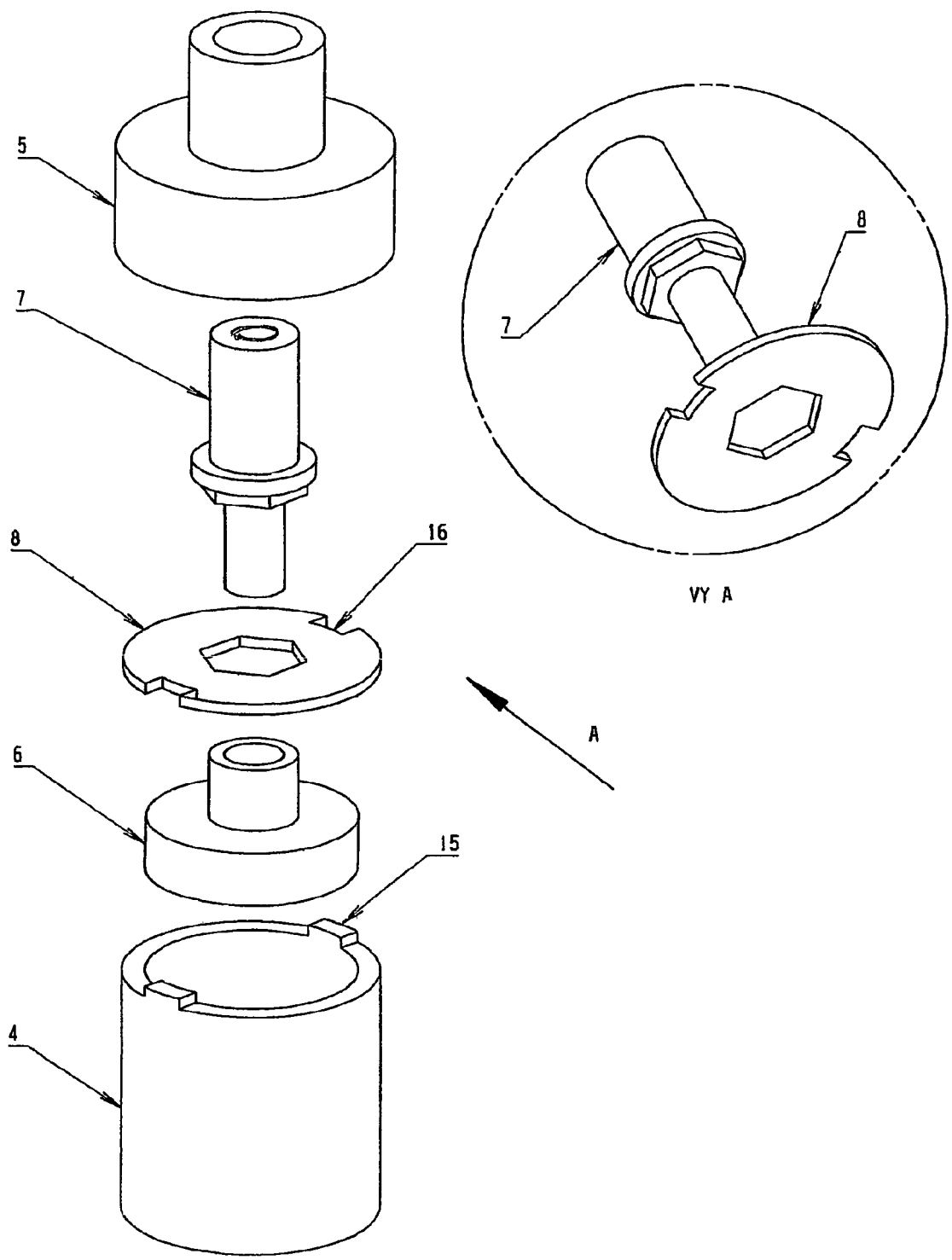
In FIG. 2 is illustrated in an exploded view In perspective an embodiment of a portion of the attachment device according to the invention.

In FIG. 2 is illustrated a somewhat modified embodiment of the attachment device according to the invention in an exploded view, whereby the modification consists In that the rod (7) has been equipped with a non-round profile at the side facing the locking washer (8). In a corresponding manner the locking washer is equipped with a non-round recess matching the non-round profile of the rod. The locking washer (8) is furthermore provided with recesses (15) arranged at the circumference, and which correspond to projections (16) in the upper edge of the cylinder (4). In this manner the piston and the rod are prevented from rotating relative to each other during mounting of the attachment device. The non-round profile of rod and locking washer have been shown hexagonal, but it is of course possible to think of other non-round shapes. The circumferential recesses (15) in the locking washer (8) can also be exchanged for circumferential projections, whereas the cylinder (4) In that case has corresponding recesses.

The invention is not limited to the embodiment shown in the drawings and described in connection thereto but modifications and variants are possible within the scope of the following claims.

The invention claimed is:

1. An explosive attachment device for mechanical connections of components, internally equipped with an explosive charge, the detonation shock effect of which is strong enough for rupturing a connection forming part of the attachment device for a rapid disconnection, said attachment device comprising:

an attachment screw having a head, which extends through and interconnects the components;

an explosive attachment element adapted to receive the attachment screw, such that the interconnected components are clamped between the head of the attachment screw and the explosive attachment element;

wherein the explosive attachment element comprises a cylinder having a cover which engages one of the interconnected components, and a piston mounted in the cylinder, said piston having a first outer diameter that is substantially the same as an inner diameter of the cylinder, and said piston being arranged inside the cylinder such that there is a substantial space between a top of the piston and a top of the cylinder and between a bottom of the piston and a bottom of the cylinder, whereby in the space between the bottom of the piston and the bottom of the cylinder there is provided a circular row of holes in a wall of the cylinder;

the piston also having a rod with a substantially smaller diameter than the inner diameter of the cylinder, the rod extending in parallel to a longitudinal mean axis of the cylinder through the cover, such that the attachment screw can be fixedly mounted in the rod; and an explosive charge located in the cylinder in a space between the piston and the cover, the explosive charge having a firing device which is equipped with a delay mechanism, whereby the attachment device, after a time delay, is exploded in such a manner that the blasting pressure is converted to a pulling stress, which pulls off the head of the attachment screw without splintering a remaining part of the device.

2. The explosive attachment device of claim 1, wherein the delay mechanism comprises a blasting fuse equipped with two igniting fuses, one positioned at each end of the blasting fuse, and an electric cable connected to one of the igniting fuses, said blasting fuse being positioned in the space between the bottom of the piston and the bottom of the cylinder and where the end of the blasting fuse having the igniting fuse which is not connected to the electric cable extends through a hole in the piston, such that the other igniting fuse will be in contact with the explosive charge.

3. The explosive attachment device of claim 2, wherein the blasting fuse is wound in spiral form in the cylinder in the space between the bottom of the piston and the bottom of the cylinder.

4. The explosive attachment device if claim 1, wherein the cover further comprises a collar having a thread arranged on its inner side, such that the cylinder will not reach a bottom of the cover but an edge of the cylinder forms a threshold in the inner wall of the closed space.

5. The explosive attachment device of claim 1, wherein the cylinder further comprises a round locking washer, an outer diameter of which is substantially as big as an inner diameter of the cover, but is substantially bigger than the inner diameter of the cylinder, said locking washer having a central hole, a diameter of which is somewhat bigger than the diameter of the rod, but substantially smaller than a collar arranged on the rod, said locking washer being fixedly mounted such that the rod extends through the central hole in the locking washer and is clamped in position against the collar of the rod by the piston, and wherein the piston has a second outer diameter which at the locking washer is substantially smaller than the inner diameter of the cylinder, forming a substantial space between the locking washer and a portion of the piston.

6. The explosive attachment device of claim 5, wherein portions of the rod, the locking washer, and the cylinder are adapted to prevent rotation of the piston and rod relative to each other.

7. The explosive attachment device of claim 1, wherein the attachment screw further comprises a washer positioned below the head of the attachment screw, and wherein the washer functions as a shearing tool.

* * * * *